(12) United States Patent
Zerguine et al.

(10) Patent No.: US 8,462,892 B2
(45) Date of Patent: Jun. 11, 2013

(54) NOISE-CONSTRAINED DIFFUSION LEAST MEAN SQUARE METHOD FOR ESTIMATION IN ADAPTIVE NETWORKS

(75) Inventors: Azzedine Zerguine, Dhahran (SA); Muhammad Omer Bin Saeed, Dhahran (SA); Salam A. Zummo, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 383 days.

(21) Appl. No.: 12/955,729

(22) Filed: Nov. 29, 2010

(65) Prior Publication Data

US 2012/0135691 A1    May 31, 2012

(51) Int. Cl.
*H04L 27/06* (2006.01)
(52) U.S. Cl.
USPC ........................................... 375/340
(58) Field of Classification Search
USPC ........................................... 375/340
See application file for complete search history.

(56) References Cited

U.S. PATENT DOCUMENTS

| | | | |
|---|---|---|---|
| 6,026,121 A | 2/2000 | Sadjadpour | |
| 6,377,611 B1 | 4/2002 | Hwang | |
| 6,741,707 B2 | 5/2004 | Ray et al. | |
| 7,298,774 B2 | 11/2007 | Miyata et al. | |
| 2002/0041678 A1 | 4/2002 | Basburg-Ertem et al. | |
| 2005/0201457 A1 | 9/2005 | Allred et al. | |
| 2008/0136645 A1 | 6/2008 | Lin et al. | |
| 2008/0260141 A1 | 10/2008 | Givens | |
| 2010/0033764 A1* | 2/2010 | Guo et al. | 358/3.03 |
| 2012/0106357 A1* | 5/2012 | Zummo et al. | 370/242 |

FOREIGN PATENT DOCUMENTS

| | | |
|---|---|---|
| CN | 101252559 A | 8/2008 |
| KR | 20050001888 A | 1/2005 |

OTHER PUBLICATIONS

Saeed et al. "Noise-Constrained Diffusion Least Mean Squares Over Adaptive networks" 2010, IEEE, pp. 288-292.*
Lopes et al. "Diffusion Least Mean Squares Over Adaptive Networks: Formulation and Performance," IEEE Trans. Signal Processing, vol. 56, No. 7, pp. 3122-3136, Jul. 2008.*
M.O. Bin Saeed, A. Zerguine and S.A. Zummo, "Variable Step-Size Least Mean Square Algorithms Over Adaptive Networks", *10th International Conference on Information Science, Signal Processing and their Applications* (ISSPA 2010), May 2010.

* cited by examiner

*Primary Examiner* — Don N Vo
(74) *Attorney, Agent, or Firm* — Richard C. Litman (57) ABSTRACT

The noise-constrained diffusion least mean square method for estimation in adaptive networks is based on the Least Mean Squares (LMS) algorithm. The method uses a variable step size in which the step-size variation rule results directly from the noise constraint.

4 Claims, 7 Drawing Sheets

NOISE-CONSTRAINED DIFFUSION LEAST MEAN SQUARE METHOD FOR ESTIMATION IN ADAPTIVE NETWORKS

BACKGROUND OF THE INVENTION

1. Field of the Invention

The present invention relates generally to sensor network and, particularly, to wireless sensor networks in which a plurality of wireless sensors are spread over a geographical location. More particularly, the invention relates to estimation in such a network utilizing a noise-constrained diffusion least mean square method for estimation in the adaptive network.

2. Description of the Related Art

In reference to wireless sensor networks, the term "diffusion" is used to identify the type of cooperation between sensor nodes in the wireless sensor network. That data that is to be shared by any sensor is diffused into the network in order to be captured by its respective neighbors that are involved in cooperation.

Wireless sensor networks include a plurality of wireless sensors spread over a geographic area. The sensors take readings of some specific data and, if they have the capability, perform some signal processing tasks before the data is collected from the sensors for more detailed thorough processing.

A "fusion-center based" wireless network has sensors transmitting all the data to a fixed center, where all the processing takes place. An "ad hoc" network is devoid of such a center and the processing is performed at the sensors themselves, with some cooperation between nearby neighbors of the respective sensor nodes.

Recently, several algorithms have been developed to exploit this nature of the sensor nodes and cooperation schemes have been formalized to improve estimation in sensor networks.

Least mean squares (LMS) algorithms are a class of adaptive filters used to mimic a desired filter by finding the filter coefficients that relate to producing the least mean squares of the error signal (i.e., the difference between the desired and the actual signal). The LMS algorithm is a stochastic gradient descent method, in that the filter is only adapted based on the error at the current time.

Figure 2:
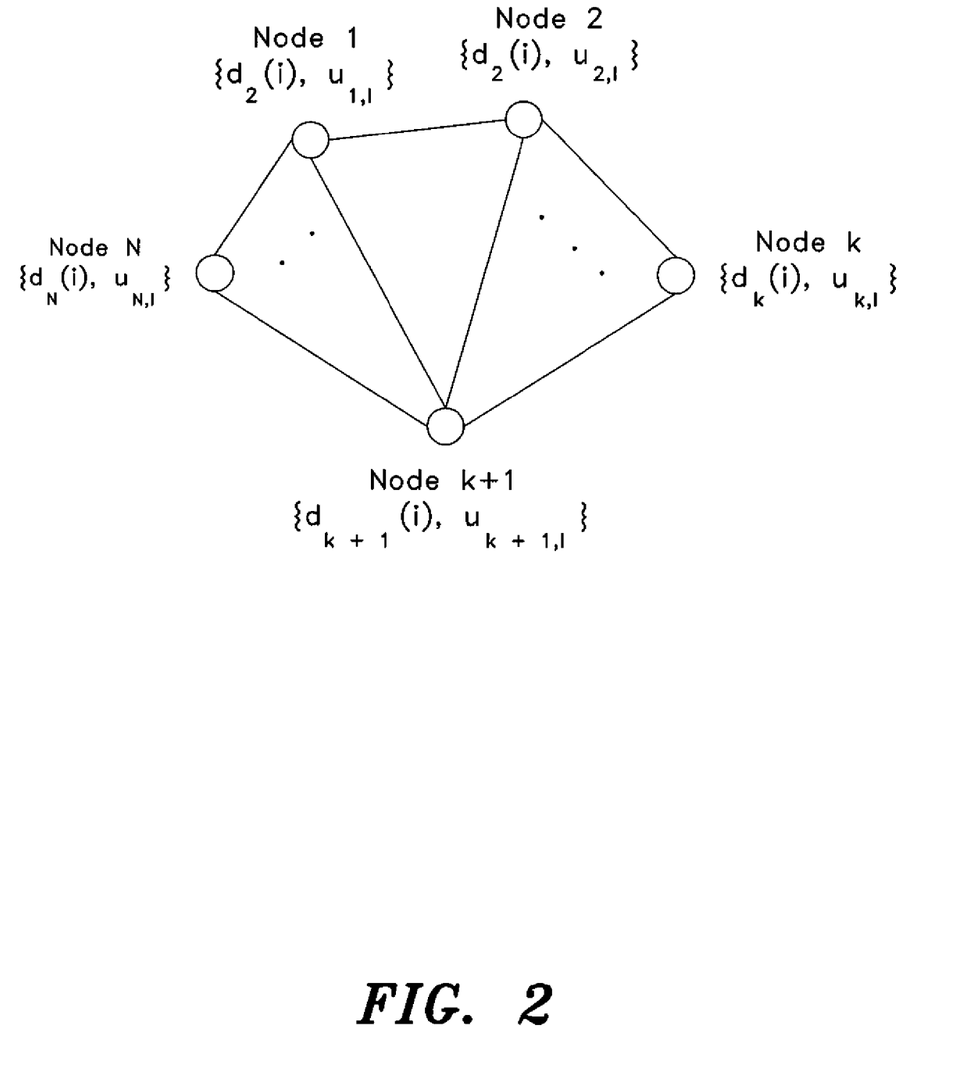
FIG. 2 is a diagram schematically illustrating an adaptive network with N nodes.

FIG. 2 diagrammatically illustrates an adaptive network having N nodes. In the following, boldface letters are used to represent vectors and matrices and non-bolded letters represent scalar quantities. Matrices are represented by capital letters and lower-case letters are used to represent vectors. The notation $(.)^T$ stands for transposition for vectors and matrices, and expectation operations are denoted as $E[.]$. The notation $(.)^*$ represents conjugate transposition and, for scalars, $(.)^*$ denotes complex conjugation. FIG. 2 illustrates an exemplary adaptive network having N nodes, where the network has a predefined topology. For each node k, the number of neighbors is given by $N_k$, including the node k itself, as shown in FIG. 2. At each iteration i, the output of the system at each node is given by:

$$d_k(i) = u_{k,i} w^0 + v_k. \tag{1}$$

where $u_{k,i}$ is a known regressor row vector of length M, $w^0$ is an unknown column vector of length M and $v_k(i)$ represents additive noise. The output and regressor data are used to produce an estimate of the unknown vector, given by $\psi_{k,i}$.

Diffusion LMS (DLMS) techniques use the data to find an estimate for the unknown vector. There are two strategies that may be employed. In the first strategy, each node combines its own estimate with the estimates of its neighbors using some combination technique, and then the combined estimate is used for updating the node estimate. This method is referred to as Combine-then-Adapt (CTA) diffusion. It is also possible to first update the estimate using the estimate from the previous iteration and then combine the updates from all neighbors to form the final estimate for the iteration. This method is known as Adapt-then-Combine (ATC) diffusion. Simulation results show that ATC diffusion outperforms CTA diffusion.

Using LMS, the CTA diffusion algorithm is given by:

$$\begin{cases} \psi_{k,i} = \varphi_{k,i} + \mu_k u_{k,i}^*(d_k(i) - u_k(i)\varphi_{k,i}) \\ \varphi_{k,i} = \sum_{l \in N_k} c_{lk} \psi_{l,i-1} \end{cases}, \tag{2}$$

where $\{c_{lk}\}_{l \in N_k}$ is a combination weight for node k, which is fixed, $\varphi_{k,i-1}$ is the combined estimate, and $\psi_{k,i}$ is the estimate for node k at iteration i, and $\mu_k$ is the node step size.

The ATC algorithm is achieved by reversing the order of the equations of equation set (2):

$$\begin{cases} \varphi_{k,i} = \psi_{k,i-1} + \mu_k u_{k,i}^*(d_k(i) - u_k(i)\psi_{k,i-1}) \\ \psi_{k,i} = \sum_{l \in N_k} c_{lk} \varphi_{l,i} \end{cases}. \tag{3}$$

Figure 3:
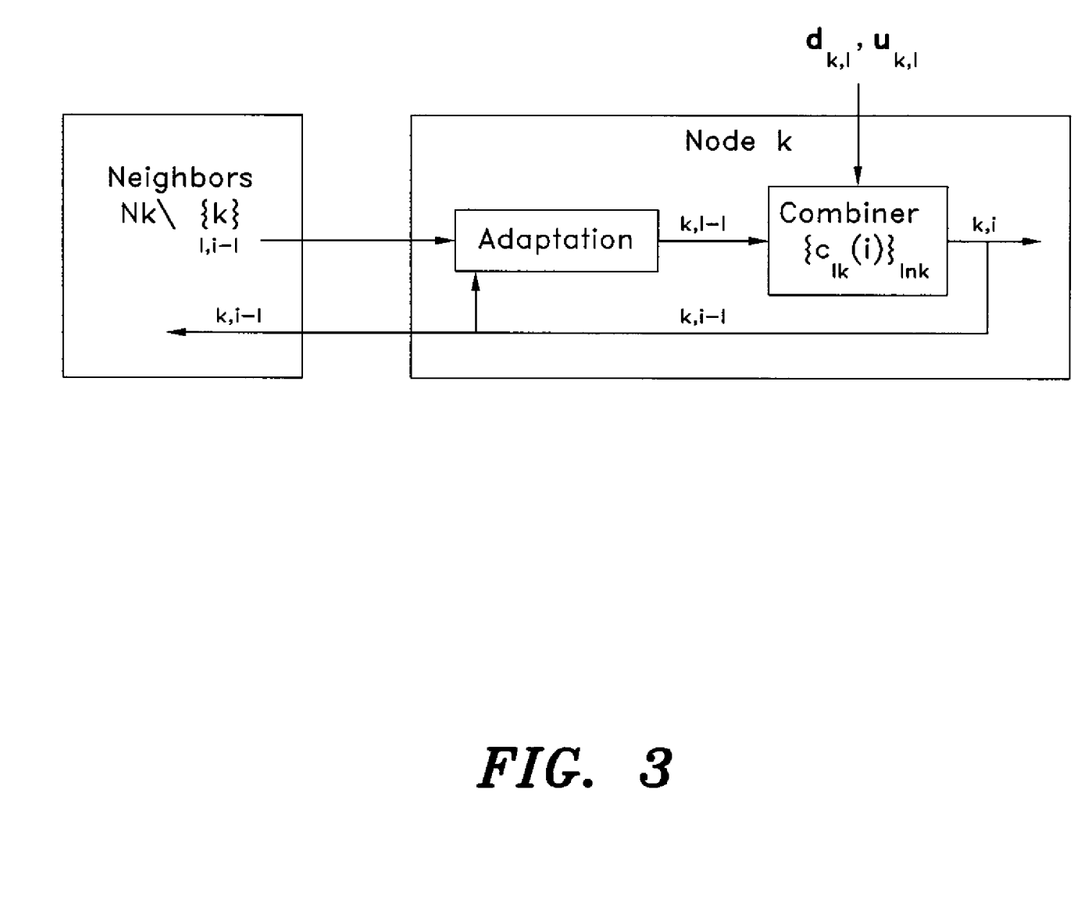
FIG. 3 is a diagram schematically illustrating an adaptive network having N nodes implementing an Adapt-then-Combine algorithm.

FIG. 3 diagrammatically illustrates the ATC algorithm implemented in an adaptive network of N nodes. The objective for a diffusion algorithm is to minimize the cost function J(w) with respect to unknown vector w, where J(w) is given by:

$$\min_w J(w) = \sum_{k=1}^{N} E[|d_k - u_k w|^2]. \tag{4}$$

Equation (4) is a global cost function. The local cost function at each node is given by:

$$J_k(w) = E[|d_k - u_k w|^2]. \tag{5}$$

Completing the squares and using the notation $E[u_k^* u_k] = R_{u,k}$, equation (5) can be rewritten as:

$$J_k(w) = \|w - w_k\|_{R_{u,k}}^2 + mmse. \tag{6}$$

The global cost function now becomes:

$$J(w) = E[|d_k - u_k w|^2] + \sum_{l \neq k}^{N} \|w - w_l\|_{R_{u,l}}^2. \tag{7}$$

The above model assumes that each node has access to the entire network. In a practical system, however, a node has access only to its closest neighbors. Thus, the cost function has to be approximated with only data from neighbors being shared at each node. As a result, the weighting matrix for the second term does not remain $R_{u,l}$ but, instead, has to be replaced by a constant weighting factor $b_{lk}$. The value of $w_l$ is also replaced by its intermediate estimate from node l, i.e., $\psi_l$. Eventually, the cost function becomes:

$$J_k(w) = E\lfloor|d_k - u_k w|^2\rfloor + \sum_{l \in N_k \setminus \{k\}} b_{lk} \|w - \psi_l\|^2. \quad (8)$$

Defining $J_k^1(w) = E\lfloor|d_k - u_k w|^2\rfloor$ yields:

$$\min_w J_k(w) = J_k^1(w) + \sum_{l \in N_k \setminus \{k\}} b_{lk} \|w - \psi_l\|^2. \quad (9)$$

Conventional LMS algorithms are not equipped to efficiently provide such estimates, particularly in complex and large adaptive networks. The diffusion scheme based on conventional LMS algorithms lacks knowledge of noise power in the system. Thus, it cannot perform well in the presence of noise. Thus, a noise-constrained diffusion least mean square method for estimation in adaptive networks solving the aforementioned problems is desired.

SUMMARY OF THE INVENTION

The noise-constrained diffusion least mean square method for estimation in adaptive networks is based on the Least Mean Squares (LMS) algorithm. The method provides for a variable step size in which the step-size variation rule results directly from the noise constraint. In a first embodiment, the noise-constrained diffusion least mean square method for estimation in adaptive networks is given by the following steps: (a) establishing an adaptive network having N nodes, where N is an integer greater than one, and for each node k, a number of neighbors of node k is given by $N_k$, including the node k, where k is an integer between one and N; (b) establishing an integer i and initially setting i=1; (c) calculating an output of the adaptive network at each node k as $d_k(i) = u_{k,i} w^0 + v_k(i)$, where $u_{k,i}$ represents a known regressor row vector of length M, $w^0$ represents an unknown column vector of length M and $v_k(i)$ represents noise in the adaptive network, where M is an integer; (d) calculating an error value $e_k(i)$ at each node k as $e_k(i) = d_k(i) - u_{k,i} w_{k,i-1}$, where $w_{k,i}$ represents an estimate of an output vector for node k at iteration i; (e) calculating a local estimate for each node neighboring node k, $\psi_{k,i}$, for each node k as $\psi_{k,i} = w_{k,i-1} + \mu_k (1 + \gamma \lambda_{k,i-1}) u_{k,i}^* e_k(i)$, where $$\lambda_{k,i} = (1 - \beta)\lambda_{k,i-1} + \frac{\beta}{2}(e_{k,i}^2 - \sigma_{v,k}^2),$$

$\beta$ and $\gamma$ being selectable unitless parameters, $\mu_k$ represents a node step size for each node k, and where $\sigma_{v,k}^2$ represents an additive noise variance; (f) calculating an estimate of an output vector $w_{k,i}$ for each node k as $$w_{k,i} = \sum_{l \in N_k} c_{lk} \psi_{l,i},$$

where l is an integer, $c_{lk}$ represents a combination weight for node k, which is fixed; (g) if $e_k(i)$ is greater than a selected error threshold, then setting i=i+1 and returning to step (c); otherwise, (h) defining a set of output vectors $w_k$ for each node k, where $w_k = w_{k,i}$; and (i) storing the set of output vectors in computer readable memory.

These and other features of the present invention will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

The noise-constrained diffusion least mean square method for estimation in adaptive networks is based on the Least Mean Squares (LMS) algorithm. The method uses a variable step size in which the step-size variation rule results directly from the noise constraint.

Assuming knowledge of the additive noise variance $\sigma_{v,k}^2$, the cost function of equation (8) may be modified as follows. The second term in equation (9) goes to zero asymptotically. This means that the problem reduces to minimizing $J_k^1(w)$ with respect to w based on the constraint $J_k^1(w) = \sigma_{v,k}^2$. The Lagrangian for this problem is given by:

$$\min_{w_k} J_k'(w_k) = J_k^1(w_k) + \sum_{l \in N_k} b_{lk} \|w_k - \psi_l\|^2 + \gamma \lambda (J_k^1(w_k) - \sigma_{v,k}^2) - \gamma \lambda_k^2, \quad (10)$$

where the last term is added as a correction term to avoid any spurious behavior. Using the Robbins-Munro algorithm, the adaptive solution now becomes:

$$w_{k,i} = w_{k,i-1} - \mu_k \frac{\partial J_k'(w_k)}{\partial w_k}, \quad (11)$$

$$\lambda_{k,i} = \lambda_{k,i-1} + \beta \frac{\partial J'_k(w_k)}{\partial \lambda_{k,i-1}}. \quad (12)$$

Solving the first partial derivative yields:

$$\frac{\partial J_k(w_k)}{\partial w_k} = (1 + \gamma\lambda_k)(R_{u,k}w_k - R_{du,k}) + \sum_{l \in N_k/\{k\}} b_{lk}(w_k - \psi_l). \quad (13)$$

Similarly, solving the second partial derivative yields:

$$\frac{\partial J'_k(w_k)}{\partial \lambda_k} = \gamma(E[|d_k - u_k w|^2] - \sigma_{v,k}^2) - 2\gamma\lambda_k, \quad (14)$$

which reduces to:

$$\lambda_{k,i} = \lambda_{k,i-1} + \beta\gamma(E[|d_k - u_k w|^2] - \sigma_{v,k}^2) - 2\beta\gamma\lambda_{k,i-1}. \quad (15)$$

Replacing $\beta\gamma$ by $\beta/2$ and incorporating the partial derivatives into the algorithm yields the steepest descent solution:

$$w_{k,i} = w_{k,i-1} + \mu_k(1 + \gamma\lambda_{k,i-1})(R_{u,k}w_k - R_{du,k}) + \quad (16)$$
$$v_k \sum_{l \in N_k/\{k\}} b_{lk}(\psi_{l,i-1} - w_{k,i-1}),$$

and $$\lambda_{k,i} = (1 - \beta)\lambda_{k,i-1} + \frac{\beta}{2}(E[|d_k - u_k w|^2] - \sigma_{v,k}^2). \quad (17)$$

Equation (16) can be broken into a two-step process, namely $$\psi_{k,i} = w_{k,i-1} + \mu_k(1 + \gamma\lambda_{k,i-1}) \cdot (R_{u,k}w_k - R_{du,k}), \quad (18)$$

$$w_{k,i} = \psi_{k,i} + v_k \sum_{l \in N_k/\{k\}} b_{lk}(\psi_{l,i-1} - \psi_{k,i-1}) \quad (19)$$
$$= \psi_{k,i}(1 - v_k + b_{kk}v_k) + v_k \sum_{l \in N_k/\{k\}} b_{lk}\psi_{l,i-1}$$
$$= \sum_{l \in N_k} c_{lk}\psi_{l,i-1},$$

where $$c_{lk} = \begin{cases} 1 - v_k + v_k b_{kk}, & l = k \\ v_k b_{lk}, & l \neq k. \end{cases}$$

Combining equations (17) and (18) with equation (16) produces the steepest descent solution to the noise-constrained problem.

In order to obtain the adaptive solution, $R_{u,k}$, $R_{du,k}$ and $E[|d_k - u_k w|^2]$ are replaced by their instantaneous values. Noting that $e_k(i) = d_k(i) - u_{k,i}w_{k,i-1}$, the replacement provides:

$$\psi_{k,i} = w_{k,i-1} + \mu_k(1 + \gamma\lambda_{k,i-1})u^*_{k,i}e_k(i), \quad (20)$$

$$w_{k,i} = \sum_{l \in N_k} c_{lk}\psi_{l,i}, \text{ and} \quad (21)$$

$$\lambda_{k,i} = (1 - \beta)\lambda_{k,i-1} + \frac{\beta}{2}(e_{k,i}^2 - \sigma_{v,k}^2), \quad (22)$$

where $$c_{lk} = \begin{cases} 1 - v_k + v_k b_{kk}, & l = k \\ v_k b_{lk}, & l \neq k. \end{cases}$$

Thus, equations (20)-(22) form the noise-constrained diffusion LMS (NCDLMS) method using the ATC approach. The ATC noise-constrained diffusion least mean square method for estimation in adaptive networks is given by the following steps: (a) establishing an adaptive network having N nodes, where N is an integer greater than one, and for each node k, a number of neighbors of node k is given by $N_k$, including the node k, where k is an integer between one and N; (b) establishing an integer i and initially setting i=1; (c) calculating an output of the adaptive network at each node k as $d_k(i) = u_{k,i}w^0 + v_k(i)$, where $u_{k,i}$ represents a known regressor row vector of length M, $w^0$ represents an unknown column vector of length M and $v_k(i)$ represents noise in the adaptive network, where M is an integer; (d) calculating an error value $e_k(i)$ at each node k as $e_k(i) = d_k(i) - u_{k,i}w_{k,i-1}$, where $w_{k,i}$ represents an estimate of an output vector for node k at iteration i; (e) calculating a local estimate for each node neighboring node k, $\psi_{k,i}$, for each node k as $\phi_{k,i} = w_{k,i-1} + \mu_k(1 + \gamma\lambda_{k,i-1})u_{k,i}^*e_k(i)$, where $$\lambda_{k,i} = (1 - \beta)\lambda_{k,i-1} + \frac{\beta}{2}(e_{k,i}^2 - \sigma_{v,k}^2),$$

$\beta$ and $\gamma$ being selectable unitless parameters, $\mu_k$ represents a node step size for each node k, and where $\sigma_{v,k}^2$ represents an additive noise variance; (f) calculating an estimate of an output vector $w_{k,i}$ for each node k as $$w_{k,i} = \sum_{l \in N_k} c_{lk}\psi_{l,i},$$

where l is an integer, $c_{lk}$ represents a combination weight for node k, which is fixed; (g) if $e_k(i)$ is greater than a selected error threshold, then setting i=i+1 and returning to step (c); otherwise, (h) defining a set of output vectors $w_k$ for each node k, where $w_k = w_{k,i}$; and (i) storing the set of output vectors in computer readable memory.

In order to perform mean transient analysis on the ATC scheme, we use the following conditions:

$$w^{(o)}\Delta = I_N \otimes w^o, \, d_i\Delta = \text{col}\{d_1(i), \ldots, d_N(i)\},$$

$$U_i\Delta = \text{diag}\{u_{1,i}, \ldots u_{N,i}\}, \, v_i\Delta = \text{col}\{v_1(i), \ldots v_N(i)\},$$

where $\otimes$ is the Kronecker product and the N×1 vector $d_i$ is given by $d_i = U_i w^{(o)} + v_i$. Defining $D = \text{diag}\{\mu_1 I_M, \ldots, \mu_N I_M\}$ and $L_{i-1} = \text{diag}\{(1+\gamma\lambda_{1,i-1})I_M, \ldots, (1+\gamma\lambda_{N,i-1})I_M\}$, then the combiner weight-matrix may be defined as $C\Delta = [c_1, \ldots, c_N]$, which allows us to write $G\Delta = C \otimes I_M$. Next, defining the weight-error vector as $w_i\Delta = w^o - w_i$ and noting the fact that $w^i\Delta = \text{col}\{w_i, \ldots, w_N\}$, yields:

$$w^i\Delta = w^{(o)} - w^i. \quad (26)$$

Rearranging the above produces:

$$w^i = w^{(o)} - w^i \quad (27)$$
$$= G(w^{(o)} - \psi^i)$$
$$= G[w^{(o)} - w^{i-1} - DL_{i-1}U_i^*(d_i - U_i w^{i-1})]$$
$$= G[w^{i-1} - DL_{i-1}U_i^*(U_i w^{i-1} + v_i)].$$

Taking expectation value and solving the above yields:

$$E[w^i] = G(I_{NM} - DE[L_{i-1}]R_U)E[w^{i-1}]. \quad (28)$$

Letting $E[B_{i-1}] = (I_{NM} - DE[L_{i-1}]R_U)$, it can be seen that the stability of the system depends on $\bar{\lambda}|GE[B_{i-1}]|<1$, where $\bar{\lambda}$ defines the eigenvalues for $|GE[B_{i-1}]|$. The two-norm of a matrix is defined as the largest singular value of the matrix. Using the two-norm, we can express the product of G and $E[B_{i-1}]$ as:

$$\|GE[B_{i-1}]\|_2 \leq \|G\|_2 \cdot \|E[B_{i-1}]\|_2. \quad (29)$$

Since we already have $G = C \otimes I_M$ and we know that $B_{i-1}$ and $R_U$ are Hermitian and block diagonal, equation (29) reduces to:

$$|\bar{\lambda}_{max}(GE[B_{i-1}])| \leq \|C\|_2 \cdot |\bar{\lambda}_{max}(E[B_{i-1}])|. \quad (30)$$

A combiner rule is picked such that $\|C\|_2 \leq 1$, so that the cooperative scheme provides robustness over the non-cooperative scheme. For a symmetric matrix C, we have $\|C\|_2 = 1$ so that:

$$|\bar{\lambda}_{max}(GE[B_{i-1}])| \leq |\bar{\lambda}_{max}(E[B_{i-1}])|. \quad (31)$$

This means that the cooperative system will always be stable as long as the non-cooperative system is stable. For the non-cooperative system to be stable, the step-size should be such that $|\bar{\lambda}_{max}(E[B_{i-1}])| \leq 1$.

Expanding the above and solving gives the step-size range for node k:

$$0 < \mu_k \leq \frac{2}{\bar{\lambda}_{max}(E[1 + \gamma\lambda_{k,\infty}] \cdot R_{u,k})}, \quad (32)$$

where $\lambda_{k,\infty}$ is the steady-state value for the Lagrangian and should ideally reduce to zero, resulting in the familiar expression for the step-size:

$$0 < \mu_k \leq \frac{2}{\bar{\lambda}_{max}(R_{u,k})}. \quad (33)$$

Figure 4:
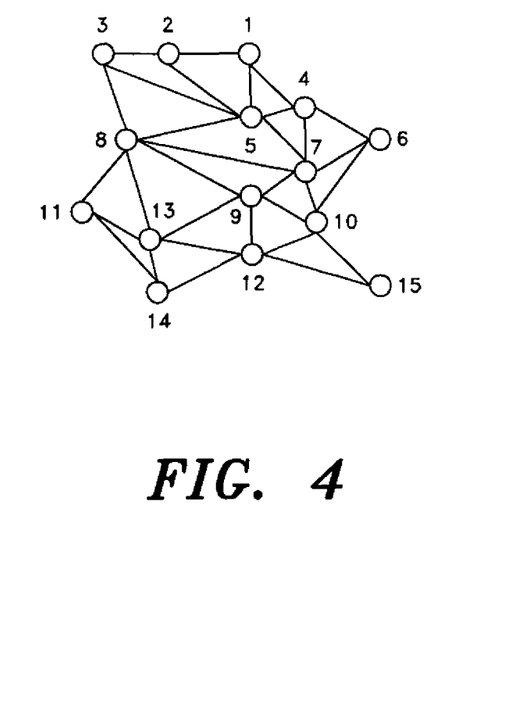
FIG. 4 is a diagram schematically illustrating an adaptive network having N=15 nodes in an example of the noise-constrained diffusion least mean square method for estimation in adaptive networks according to the present invention.
Figure 5A:
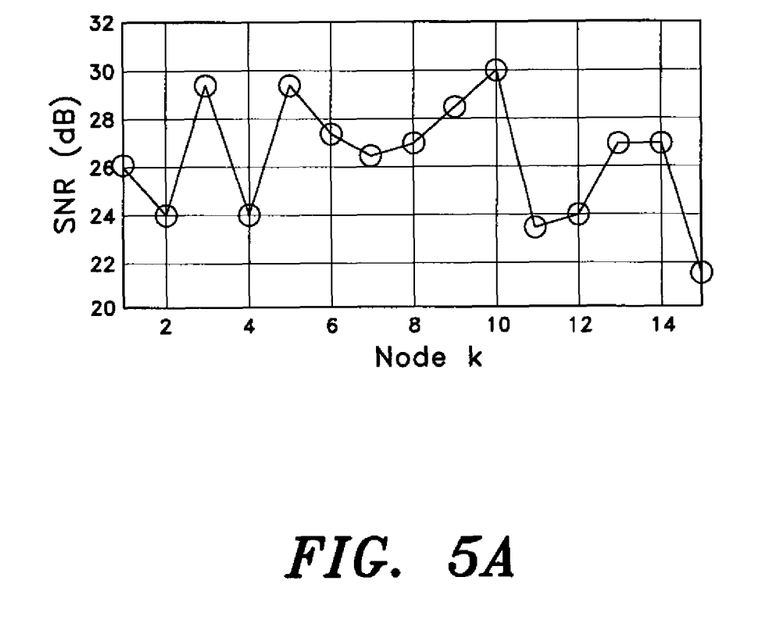
FIG. 5A is a graph of signal-to-noise ratio as chosen for simulation at each node in the exemplary simulation of FIG. 4.
Figure 5B:
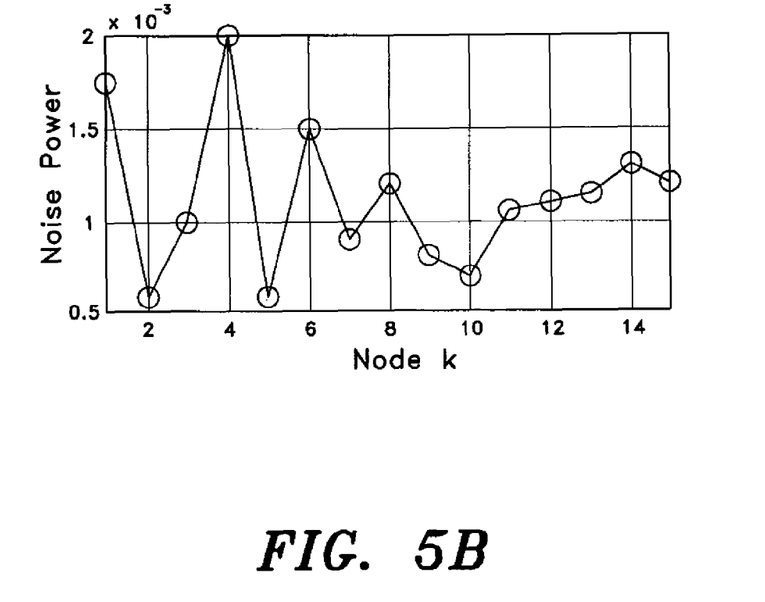
FIG. 5B is a graph of a simulated value of noise power at each node in the exemplary simulation of FIG. 4.

Simulation results are provided below to illustrate the performance of the present NCDLMS method. Comparisons are shown against the Diffusion LMS (DLMS) method. Simulations have been performed for an exemplary network containing N=15 nodes connected as shown in FIG. 4. FIGS. 5A and 5B illustrate the characteristics of the signals and noise variances at each node of the network, respectively. The unknown vector is of length M=5 in this simulation example and is taken to be $w^o = 1/\sqrt{5}$, where l is a column vector of length M containing all 1 values. The input regressor vectors are zero-mean independent Gaussian random variables with the variance for each node as per the SNR shown in FIG. 5A. The additive noise is also zero-mean Gaussian with variance as plotted in FIG. 5B.

The NCDLMS algorithm is compared with DLMS for both the CTA as well as the ATC variations. Also plotted is the case where no cooperation takes place between nodes; i.e., simple LMS adaptation without combining. Step-sizes for the DLMS and no cooperation case are all set to $\mu_k=0.01$. For the NCDLMS algorithm, the initial step-size is set at $\mu_k=0.025$, whereas $\beta=0.01$ and $\gamma=141$. For all three diffusion cases, the Metropolis rule is used for combining.

Figure 6A:
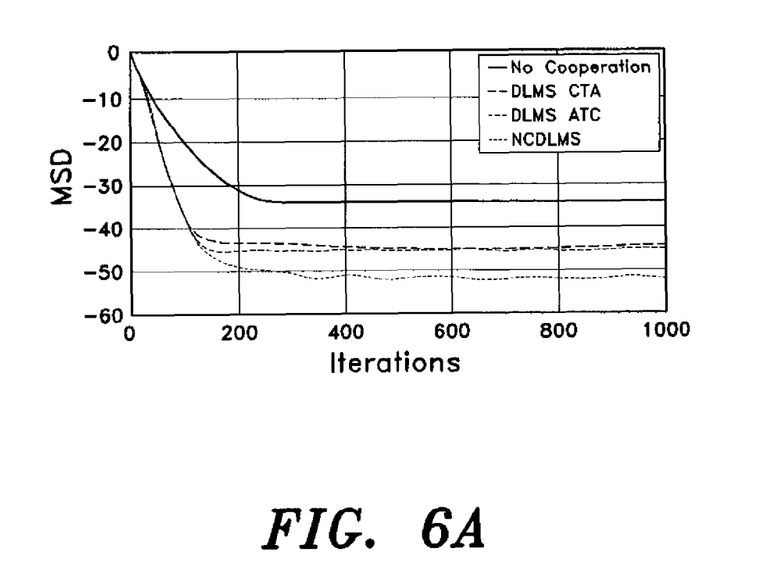
FIGS. 6A and 6B are comparison plots illustrating mean square deviation and excess mean square error as a function of iteration, respectively, comparing prior art techniques with the noise-constrained diffusion least mean square method for estimation in adaptive networks according to the present invention.
Figure 6B:
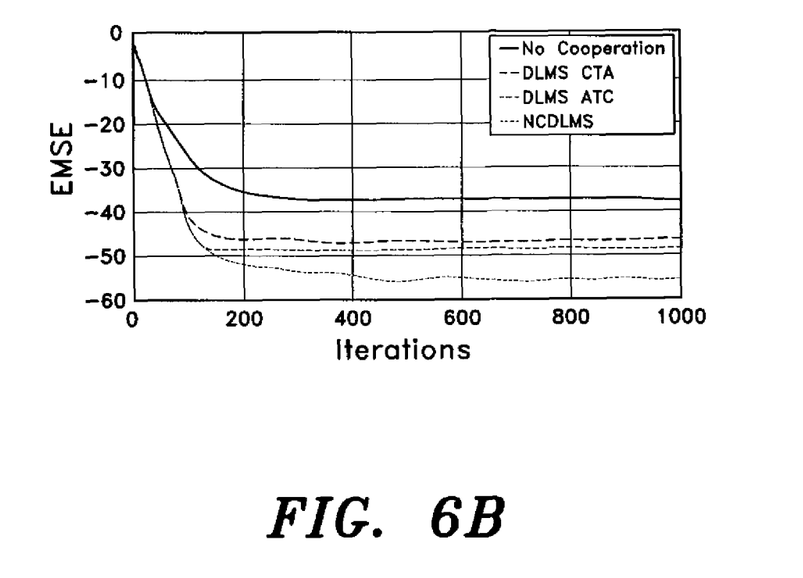

FIG. 6A shows the Mean Square Deviation (MSD) and FIG. 6B shows the Excess Mean Square Error (EMSE) for all comparative methods. Since the convergence rate is approximately the same, it can be seen that the difference is in the error floor. The ATC method slightly outperforms the CTA method. However, the NCDLMS method provides the best performance.

Figure 7:
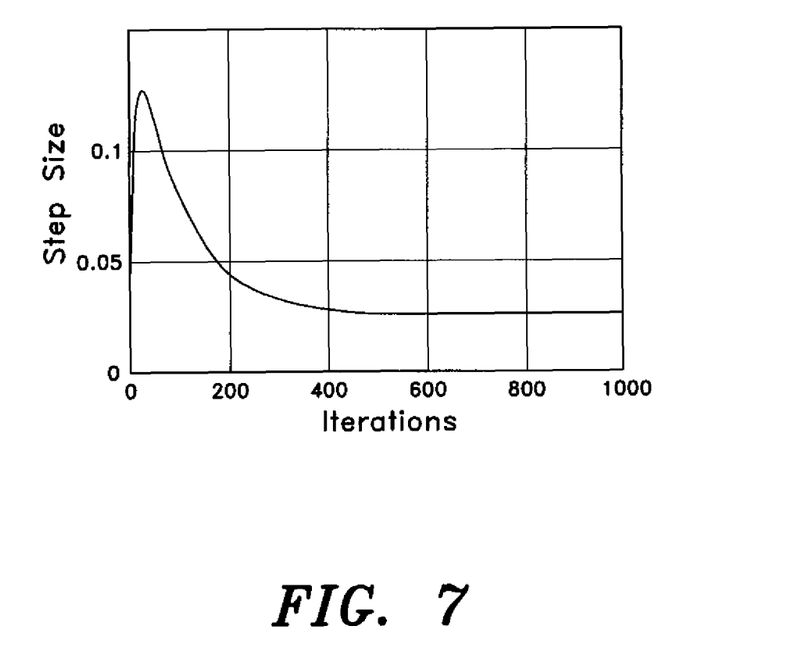
FIG. 7 is a graph illustrating step-size evolution in the noise-constrained diffusion least mean square method for estimation in adaptive networks according to the present invention at a single, exemplary node.
Figure 8A:
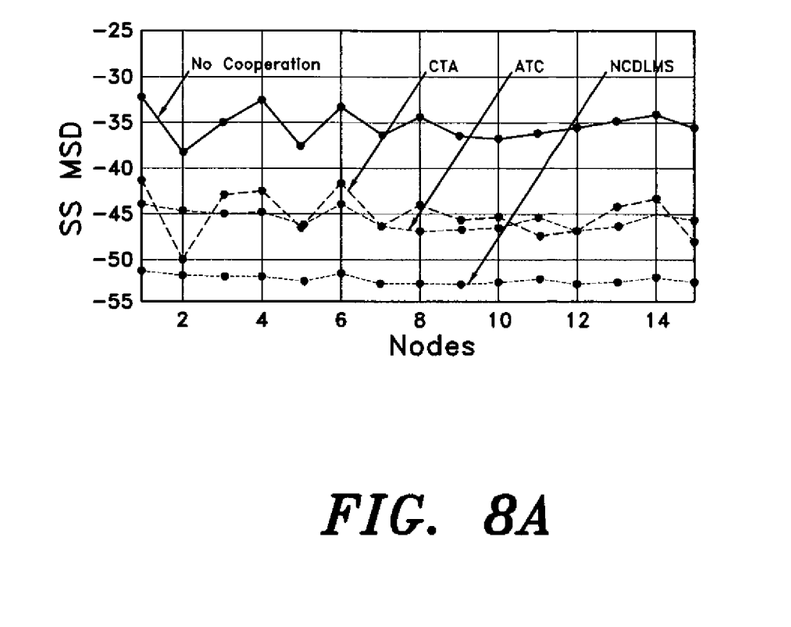
FIGS. 8A and 8B are comparison plots illustrating steady-state mean square deviation and steady-state excess mean square error at each node, respectively, comparing prior art techniques with the noise-constrained diffusion least mean square method for estimation in adaptive networks according to the present invention.
Figure 8B:
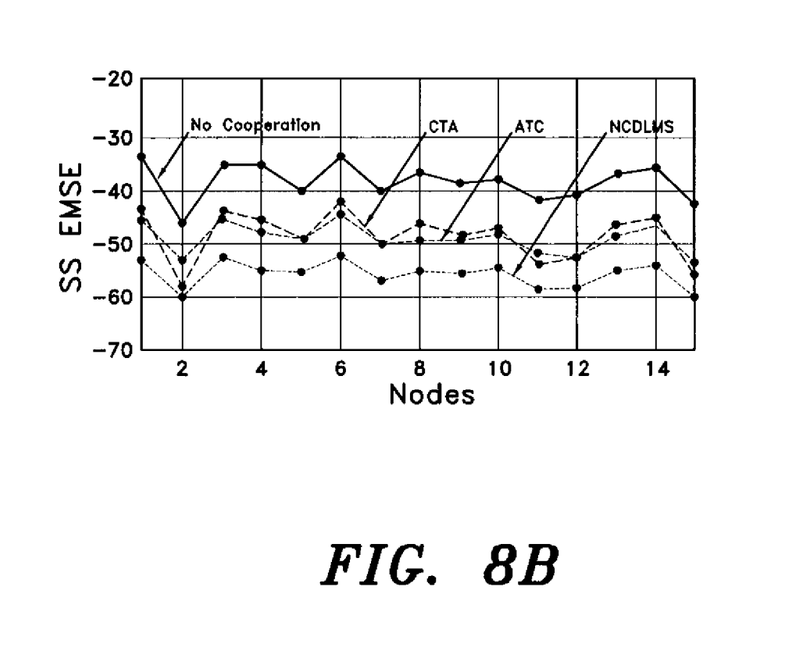

FIG. 7 illustrates how the step-size $\mu_k(1+\gamma\lambda_{k,i})$ varies with time for node 13. As expected, $\lambda_k$ goes to zero for all nodes asymptotically, resulting in a constant step-size. A similar trend is followed for the step-size at each node. FIGS. 8A and 8B show the steady-state MSD and EMSE values for each node, respectively, and illustrate great improvement in performance obtained through the use of the noise-constrained diffusion least mean square method for estimation in adaptive networks.

Figure 1:
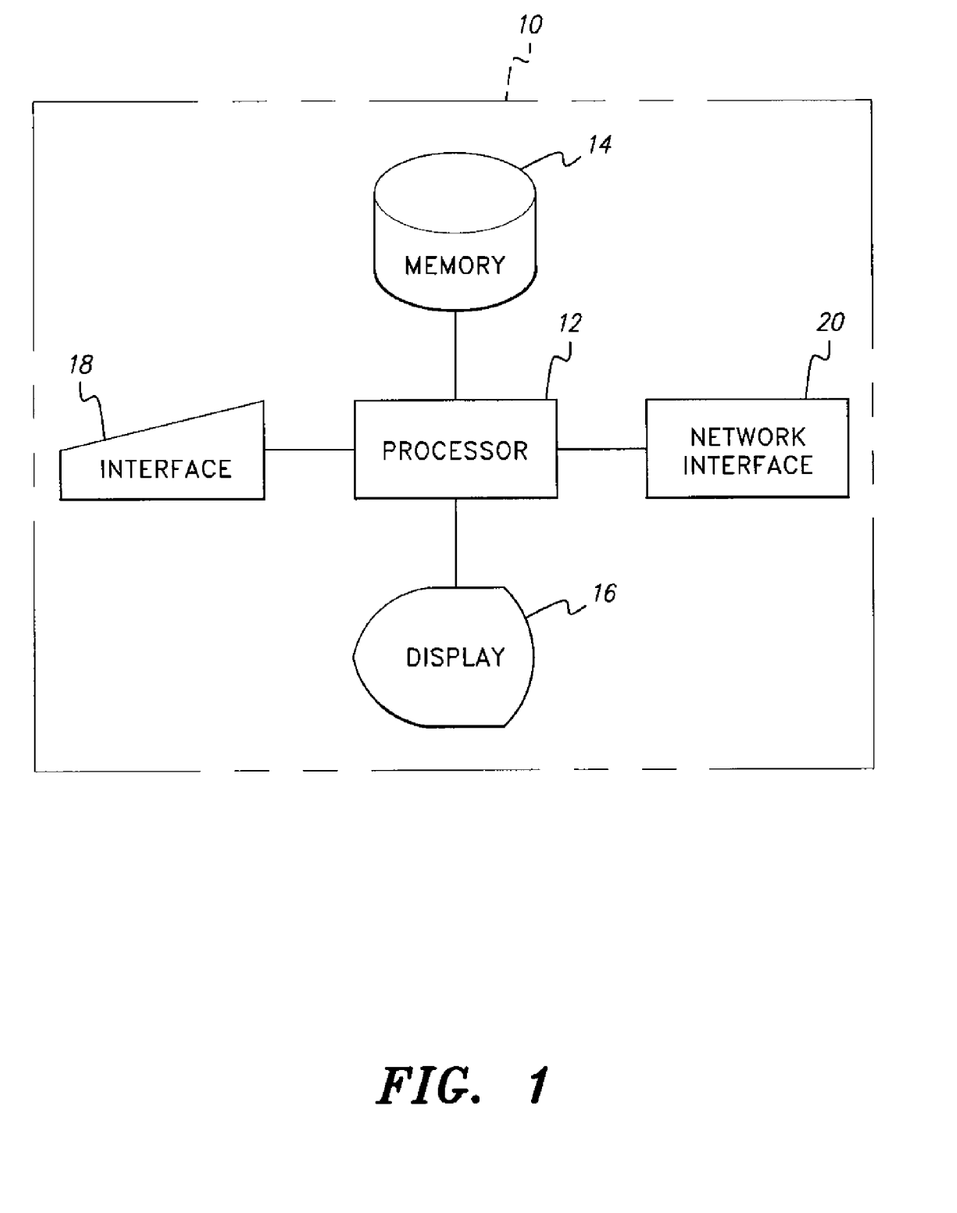
FIG. 1 is a block diagram of a system for implementing a noise-constrained diffusion least mean square method for estimation in adaptive networks according to the present invention.

FIG. 1 illustrates a generalized system 10 for implementing the noise-constrained diffusion least mean square method for estimation in adaptive networks, although it should be understood that the generalized system 10 may represent a stand-alone computer, computer terminal, portable computing device, networked computer or computer terminal, or networked portable device. Data may be entered into the system 10 by the user via any suitable type of user interface 18, and may be stored in computer readable memory 14, which may be any suitable type of computer readable and programmable memory. Calculations are performed by the processor 12, which may be any suitable type of computer processor, and may be displayed to the user on the display 16, which may be any suitable type of computer display. The system 10 preferably includes a network interface 20, such as a modem or the like, allowing the computer to be networked with either a local area network or a wide area network.

The processor 12 may be associated with, or incorporated into, any suitable type of computing device, for example, a personal computer or a programmable logic controller. The display 16, the processor 12, the memory 14, the user interface 18, network interface 20 and any associated computer readable media are in communication with one another by any suitable type of data bus, as is well known in the art. Additionally, other standard components, such as a printer or the like, may interface with system 10 via any suitable type of interface.

Examples of computer readable media include a magnetic recording apparatus, an optical disk, a magneto-optical disk, and/or a semiconductor memory (for example, RAM, ROM, etc.). Examples of magnetic recording apparatus that may be used in addition to memory 14, or in place of memory 14, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

It is to be understood that the present invention is not limited to the embodiments described above, but encompasses any and all embodiments within the scope of the following claims.

We claim:

1. A noise-constrained diffusion least mean square method for estimation in adaptive networks, comprising the steps of:
   (a) establishing an adaptive network having N nodes, wherein N is an integer greater than one, and for each node k, a number of neighbors of node k is given by $N_k$, including the node k, wherein k is an integer between one and N;
   (b) establishing an integer i and initially setting i=1;
   (c) calculating an output of the adaptive network at each node k as $d_k(i)=u_{k,i}w^0+v_k(i)$, wherein $u_{k,i}$ represents a known regressor row vector of length M, $w^0$ represents an unknown column vector of length M and $v_k(i)$ represents noise in the adaptive network, wherein M is an integer;
   (d) calculating an error value $e_k(i)$ at each node k as $e_k(i)=d_k(i)-u_{k,i}w_{k,i-1}$, wherein $w_{k,i}$ represents an estimate of an output vector for node k at iteration i;
   (e) calculating a local estimate for each node neighboring node k, $\psi_{k,i}$, for each node k as $\psi_{k,i}=w_{k,i-1}+\mu_k(1+\gamma\lambda_{k,i-1})u_{k,i}{}^*e_k(i)$, wherein $$\lambda_{k,i} = (1-\beta)\lambda_{k,i-1} + \frac{\beta}{2}(e_{k,i}^2 - \sigma_{v,k}^2),$$

$\beta$ and $\gamma$ being selectable unitless parameters, $\mu_k$ represents a node step size for each node k, and wherein $\sigma_{v,k}^2$ represents an additive noise variance;
   (f) calculating an estimate of an output vector $w_{k,i}$ for each node k as $$w_{k,i} = \sum_{l \in N_k} c_{lk}\psi_{l,i},$$

wherein l is an integer, $c_{lk}$ represents a combination weight for node k;
   (g) if $e_k(i)$ is greater than a selected error threshold, then setting i=i+1 and returning to step (c); otherwise,
   (h) defining a set of output vectors $w_k$ for each node k, where $w_k=w_{k,i}$; and
   (i) storing the set of output vectors in computer readable memory.

2. The noise-constrained diffusion least mean square method for estimation in adaptive networks as recited in claim 1, wherein in step (f), $c_{lk}$ is calculated as $c_{lk}=1-v_k+v_kb_{kk}$ if l=k; otherwise, $c_{lk}$ is calculated as $c_{lk}=v_kb_{lk}$ if l≠k, wherein $b_{lk}$ is a constant weighting factor.

3. A system for performing noise-constrained diffusion least mean square estimation in adaptive networks, wherein the adaptive network has N nodes, wherein N is an integer greater than one, and for each node k, a number of neighbors of node k is given by $N_k$, including the node k, wherein k is an integer between one and N, the system comprising:
   a processor;
   computer readable memory coupled to the processor;
   a user interface coupled to the processor;
   a display; and
   software stored in the memory and executable by the processor, the software having:
     means for establishing an integer i and initially setting i=1;
     means for calculating an output of the adaptive network at each node k as $d_k(i)=u_{k,i}w^0+v_k(i)$, wherein $u_{k,i}$ represents a known regressor row vector of length M, $w^0$ represents an unknown column vector of length M and $v_k(i)$ represents noise in the adaptive network, wherein M is an integer;
     means for calculating an error value $e_k(i)$ at each node k as $e_k(i)=d_k(i)-u_{k,i}w_{k,i-1}$, wherein $w_{k,i}$ represents an estimate of an output vector for node k at iteration i;
     means for calculating a local estimate for each node neighboring node k, $\psi_{k,i}$, for each node k as $\psi_{k,i}=w_{k,i-1}+\mu_k(1+\gamma\lambda_{k,i-1})u_{k,i}{}^*e_k(i)$, wherein $$\lambda_{k,i} = (1-\beta)\lambda_{k,i-1} + \frac{\beta}{2}(e_{k,i}^2 - \sigma_{v,k}^2),$$

$\beta$ and $\gamma$ being selectable unitless parameters, $\mu_k$ representing a node step size for each node k, and wherein $\sigma_{v,k}^2$ represents an additive noise variance;
     means for calculating an estimate of an output vector $w_{k,i}$ for each node k as $$w_{k,i} = \sum_{l \in N_k} c_{lk}\psi_{l,i},$$

wherein l is an integer, $c_{lk}$ represents a combination weight for node k;
     means for setting i=i+1 and re-calculating the output of the adaptive network at each node k if $e_k(i)$ is greater than a selected error threshold; and
     means for establishing a set of output vectors $w_k$ for each node k, wherein $w_k=w_{k,i}$, and storing the set of output vectors in the computer readable memory if $e_k(i)$ is less than or equal to a selected error threshold.

4. The system for performing noise-constrained diffusion least mean square estimation in adaptive networks as recited in claim 3, further comprising means for calculating $c_{lk}$ as $c_{lk}=1-v_k+v_kb_{kk}$ if l=k and calculating $c_{lk}$ as $c_{lk}=v_kb_{lk}$ if l≠k, wherein $b_{lk}$ is a constant weighting factor.

* * * * *